United States Patent
Leyden

(10) Patent No.: US 9,924,605 B2
(45) Date of Patent: Mar. 20, 2018

(54) SECURITY SYSTEM FOR ARTICLE DISPLAY AND METHOD OF SECURING THE DISPLAY

(71) Applicant: Se-Kure Controls, Inc., Franklin Park, IL (US)

(72) Inventor: Roger J. Leyden, Inverness, IL (US)

(73) Assignee: Se-Kure Controls, Inc., Franklin Park, IL (US)

( * ) Notice: Subject to any disclaimer, the term of this patent is extended or adjusted under 35 U.S.C. 154(b) by 26 days.

(21) Appl. No.: 15/155,244

(22) Filed: May 16, 2016

(65) Prior Publication Data
US 2017/0332500 A1    Nov. 16, 2017

(51) Int. Cl.
| | |
|---|---|
| *F16M 13/00* | (2006.01) |
| *H05K 5/02* | (2006.01) |
| *H05K 5/00* | (2006.01) |
| *G06Q 20/20* | (2012.01) |

(52) U.S. Cl.
CPC ......... *H05K 5/0208* (2013.01); *H05K 5/0017* (2013.01); *H05K 5/0217* (2013.01); *G06Q 20/20* (2013.01)

(58) Field of Classification Search
CPC .. E05B 73/0082; E05B 73/0005; E05B 73/00; E05B 67/383; E05B 71/00; E05B 65/00; E05B 73/0017; E05B 67/36; E05B 37/02; E05B 67/003; E05B 73/0076; E05B 15/1607; E05B 2067/386; E05B 37/025
USPC ..................... 248/346.01, 346.05, 346.5, 551
See application file for complete search history.

(56) References Cited

U.S. PATENT DOCUMENTS

| | | | |
|---|---|---|---|
| 7,032,872 B2 * | 4/2006 | Sullivan | F16M 13/00 248/346.06 |
| 7,866,623 B2 * | 1/2011 | Lampman | A47F 7/024 248/186.2 |
| 2011/0133050 A1 * | 6/2011 | Eisenberger, Sr. | E05B 73/0082 248/551 |
| 2012/0075789 A1 * | 3/2012 | DeCamp | F16M 11/041 361/679.26 |
| 2014/0124644 A1 * | 5/2014 | Wong | E05B 73/0082 248/553 |

\* cited by examiner

*Primary Examiner* — Steven Marsh
(74) *Attorney, Agent, or Firm* — Wood, Phillips, Katz, Clark & Mortimer

(57) ABSTRACT

The combination of a display and a security system. The display has a support assembly configured to maintain at least one article in a display position and a base assembly configured to maintain the support assembly in an operative state on a subjacent surface wherein the support assembly can be moved relative to the base assembly to reposition an article in the display position relative to the base assembly. The security system has an anchoring assembly configured to be operatively secured relative to a subjacent surface and/or another object in the vicinity of a subjacent surface at a display location at which the display is to be supported to prevent removal of the display from the display location. The security system and display are configured to be releasably placed in an engaged relationship wherein the base assembly cannot be separated from the anchoring assembly.

20 Claims, 4 Drawing Sheets

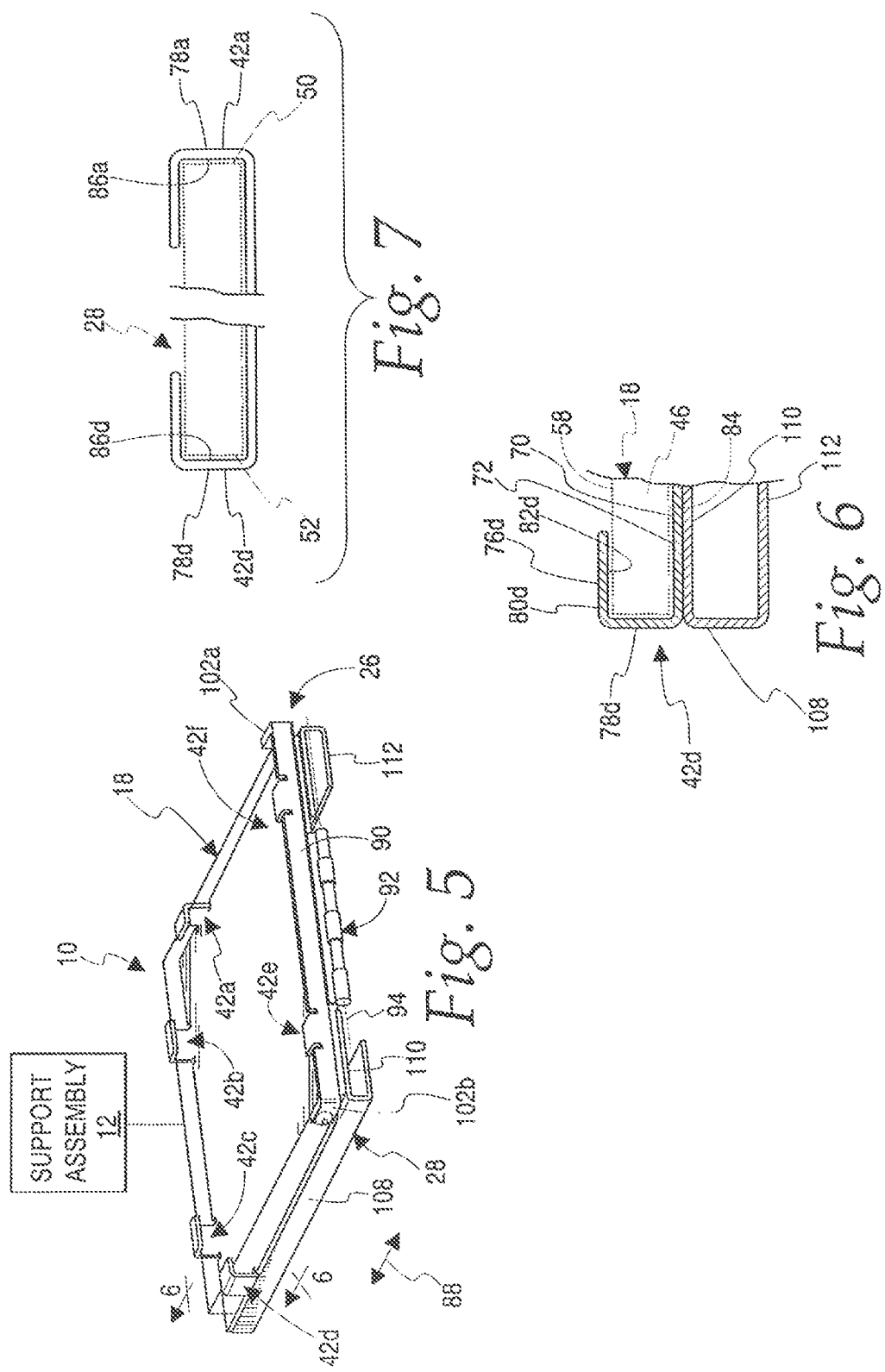

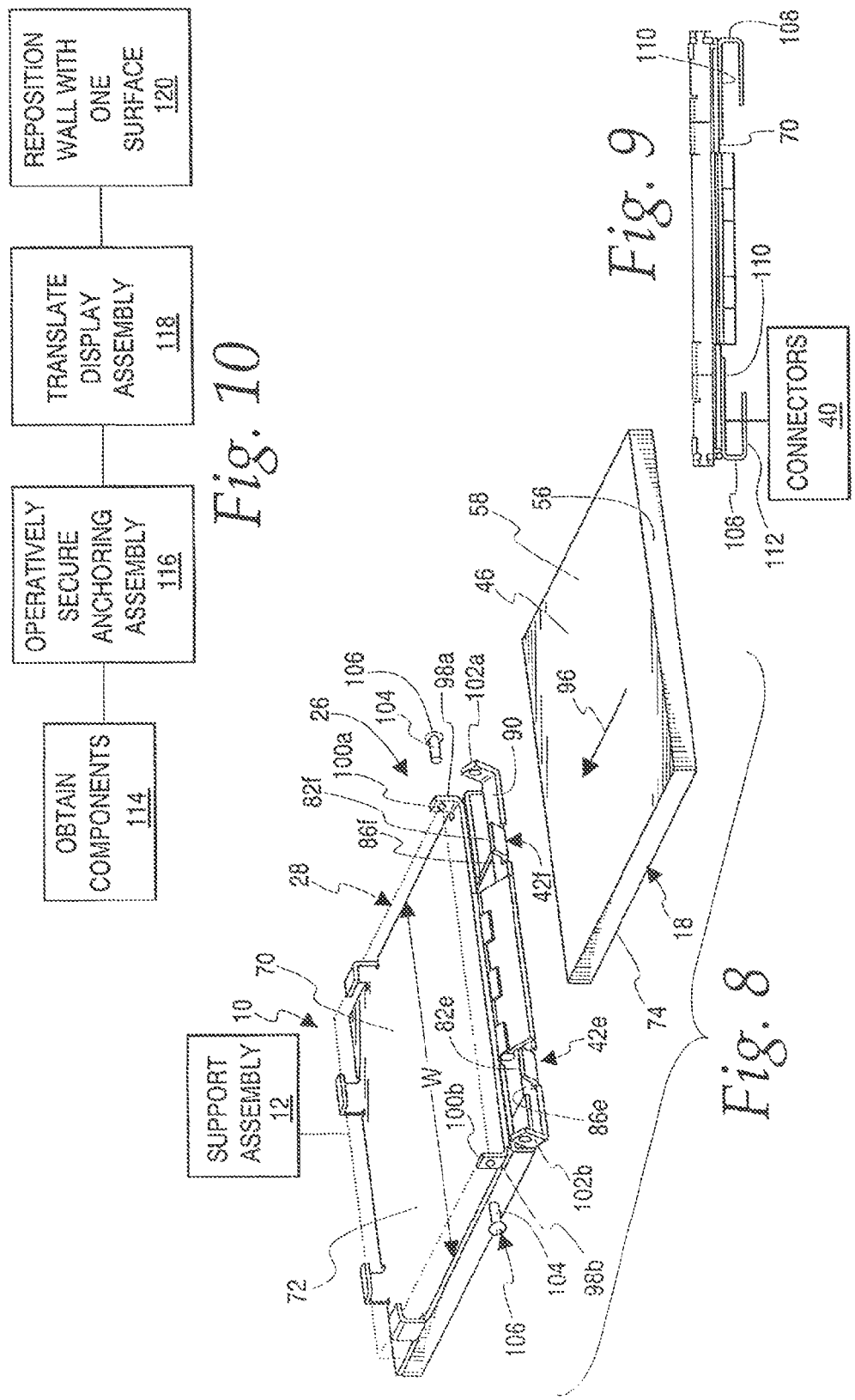

SECURITY SYSTEM FOR ARTICLE DISPLAY AND METHOD OF SECURING THE DISPLAY

BACKGROUND OF THE INVENTION

Field of the Invention

This invention relates to security systems and, more particularly, to a security system for a point-of-purchase display that can be repositioned by a potential product purchaser, as by turning, to facilitate product viewing.

Background Art

In most retail establishments, display space is at a premium. Displays are designed with the objectives of maximizing the use of space while at the same time displaying articles in an aesthetically pleasing manner and whereby they might be conveniently viewed and accessed by a potential purchaser.

One category of display that came into being with the above objectives in mind is that which can be repositioned by a potential purchaser. This type of display is commonly floor mounted or mounted on the top of counters and is designed on the principles of a Lazy Susan. A base supports the display on an underlying surface. An article supporting structure is mounted on the base and typically will be constructed to be movable guidingly around an axis relative to the base. The article supporting structure may have generally flat sides at its perimeter at which displayed articles are placed. A potential purchaser can manually grasp the article supporting structure and turn it around the axis to bring the desired perimeter region of the display into clear view for article inspection. With an exemplary squared shape, this type of display potentially allows approximately four times as many products to be displayed compared to a stationary display occupying approximately the same volume.

It is also known to provide an automated mechanism for displays of this type whereby a user might actuate a drive that causes indexed movement of the article support structure around an axis.

Many different types of articles are exhibited in this type of display—ranging from inexpensive to pricey watches and other jewelry. The nature of the articles generally dictates the degree of accessibility of the articles to the potential purchaser. Sometimes, relatively inexpensive articles are fully exposed to be grasped and handled without any interference. More expensive items may be secured in a manner that access is permitted only with the assistance of authorized store personnel. For example, some displays may have keyed doors or windows that must be repositioned to access the articles.

While past security measures have focused on controlling normal access to articles on the display, they have not adequately addressed the ever-increasing problem of thieves making off with an entire display. Bold individuals may leave the premises with one or more such displays. Whereas individual article theft progressively accumulates to sizable revenue loss, thefts involving entire displays can quickly lead to a very significant loss, particularly given the high cost of many small watch and jewelry items that are commonly displayed in this fashion.

Heretofore, the only deterrent to such display theft has been monitoring of a premises by employee and security force observation. As thieves become more sophisticated, these existing measures are often proving to be inadequate. The industry remains in need of better measures to avoid losses attributable to theft of articles in the above types of displays.

SUMMARY OF THE INVENTION

In one form, the invention is directed to the combination of a display and a security system. The display has a support assembly configured to maintain at least one article in a display position and a base assembly configured to maintain the support assembly in an operative state on a subjacent surface wherein the support assembly can be moved relative to the base assembly to reposition an article in the display position relative to the base assembly. The security system has an anchoring assembly configured to be operatively secured relative to a subjacent surface and/or another object in the vicinity of a subjacent surface at a display location at which the display is to be supported to prevent removal of the display from the display location. The security system and display are configured to be releasably placed in an engaged relationship wherein the base assembly cannot be separated from the anchoring assembly.

In one form, the anchoring assembly has: a) a first pair of oppositely facing surfaces between which a first part of the base assembly is captively maintained with the security system and display in the engaged relationship; and b) a second pair of oppositely facing surfaces between which a second part of the base assembly is captively maintained with the security system and display in the engaged relationship.

In one form, the anchoring assembly has a support wall with an upwardly facing surface upon which the base assembly is supported with the security system and display in the engaged relationship. At least one of the oppositely facing surfaces is repositionable relative to the support wall to change the security system and display from the engaged relationship into an assembly relationship wherein the display can be separated from the security system.

In one form, the upwardly facing support wall surface defines one of the oppositely facing surfaces.

In one form, one of the oppositely facing surfaces is repositionable relative to the support wall by pivoting about an axis between first and second position. The one of the oppositely facing surfaces is in: a) the first position with the security system and display in the assembly relationship; and b) the second position with the security system and display in the engaged relationship.

In one form, one of the oppositely facing surfaces in the first pair of oppositely facing surfaces is substantially orthogonal to one of the oppositely facing surfaces in the second pair of oppositely facing surfaces.

In one form, the anchoring assembly has a first angled tab that projects from the support wall and defines with the upwardly facing support wall surface one of the pairs of oppositely facing surfaces.

In one form, the first angled tab defines one of the oppositely facing surfaces in another of the pairs of oppositely facing surfaces.

In one form, the first angled tab has an "L" shape. There are a plurality of angled tabs, the same as the first angled tab, that each defines with the upwardly facing wall surface one of the pairs of oppositely facing surfaces.

In one form, the security system and display are configured so that the base assembly, initially separated from the anchoring assembly, must be translated relative to the anchoring assembly to place the security system and display in the engaged relationship.

In one form, the first angled tab and support wall are defined by a single piece.

In one form, the support assembly is configured to be moved relative to the base assembly around an axis.

In one form, the security system has a fastening system configured to maintain the anchoring assembly operatively secured.

In one form, the fastening system has at least one of: a) at least one component configured to fix the anchoring assembly to a subjacent surface; and b) at least one component configured to confine movement of the anchoring assembly relative to a subjacent surface, to which the anchoring assembly is operatively secured, to within a predetermined range.

In one form, the combination further includes a fastener for releasably fixing a wall, on which the one of the oppositely facing surfaces is defined, to thereby maintain the one of the oppositely facing surfaces in the second position.

In one form, the anchoring assembly further includes at least one spacer that acts between the support wall and a subjacent surface upon which the anchoring assembly is supported with the anchoring assembly operatively secured.

In one form, there is a tab that projects from the wall, on which the one of the oppositely facing surfaces is defined, that defines another one of the oppositely facing surfaces.

In one form, the support wall has a peripheral edge defined by:
a) a first pair of spaced substantially straight and parallel edge portions; and
b) a second pair of spaced substantially straight and parallel edge portions that are angled with respect to the first pair of edge portions.

In one form, the support assembly has a vertical central axis and a plurality of sides spaced around the vertical central axis in each of which a receptacle is defined for an article to be placed in a display position.

In one form, the invention is directed to a method of securing a display in the combination as described above. The method includes the steps of: operatively securing the anchoring assembly at a display location; with the one oppositely facing surface in one position relative to the support wall translating the display assembly from an initially separated position relative to the anchoring assembly to thereby cause the first and second parts of the base assembly to be respectively captively located between the first and second pairs of oppositely facing surfaces; and repositioning the one oppositely facing surface relative to the support wall to thereby place the security system and display into the engaged relationship.

BRIEF DESCRIPTION OF THE DRAWINGS

FIG. 5 is a partially schematic, perspective view of one specific form of the inventive security system and the display in FIGS. 2 and 3 in an engaged relationship;

FIG. 6 is an enlarged, cross-sectional view of a connection between the security system and display, taken along line 6-6 of FIG. 5;

FIG. 7 is a fragmentary elevation view of connections between the display and a part of the security system at opposite sides;

FIG. 8 is a view as in FIG. 5 wherein the security system and display are changed into an assembly relationship and showing a panel on the display in a separated state in solid lines and in dotted lines with the security system and display in their engaged relationship;

FIG. 9 is a front elevation view of the anchoring assembly in the state in FIG. 5; and FIG. 10 is a flow diagram representation of a method of securing a display on a security system, according to the present invention.

DETAILED DESCRIPTION OF THE PREFERRED EMBODIMENT

Figure 1:
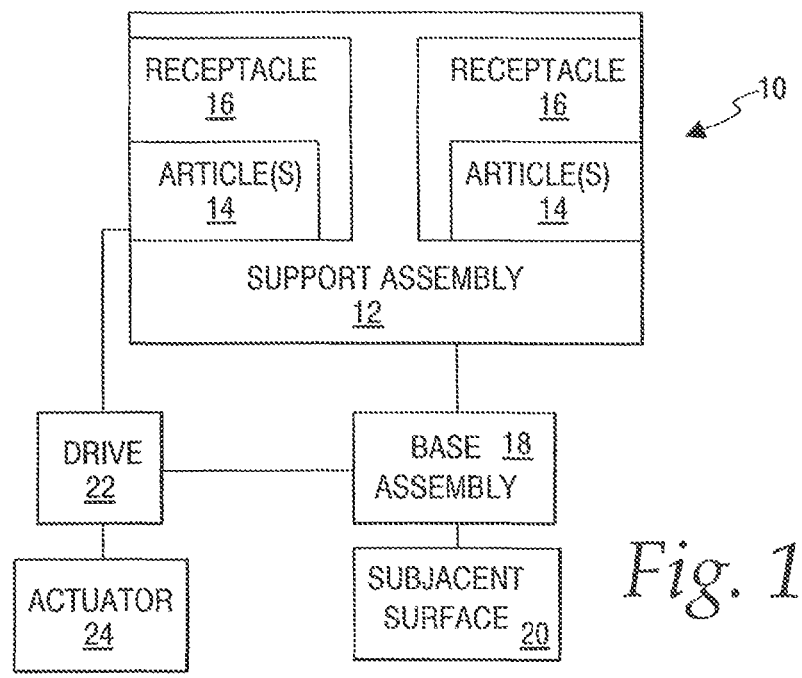
FIG. 1 is a schematic representation of a display of the type with which a security system, according to the present invention, can be utilized.

In FIG. 1, a display, with which a security system according to the present invention can be utilized, is shown schematically at 10. The display 10 consists of a support assembly 12 configured to maintain at least one article 14 in a display position. Typically, a plurality of receptacles 16 will be provided, each configured to accommodate at least one of the articles 14 which is placed in a display position therein.

A base assembly 18 is configured to maintain the support assembly 12 in an operative state in relationship to a subjacent surface 20. In this operative state, the support assembly 12 can be moved relative to the base assembly 18 to thereby reposition articles 14 in the display position relative to the base assembly 18 and the subjacent surface 20 upon which it is supported.

The generic showing of this relationship is intended to encompass any relative movement between the support assembly 12 and base assembly 18 that allows a potential purchaser to reposition the displayed articles 14 so that from a given position the potential purchaser can view different articles 14 or the same article 14 from a different perspective. The schematic showing is intended to encompass virtually any type of mechanism that allows relative movement, with but one exemplary form described hereinbelow.

The potential purchaser may manually grasp and reposition the support assembly 12. Alternatively, an appropriate drive 22 can be used to effect this movement as initiated through an actuator 24.

Figure 2:
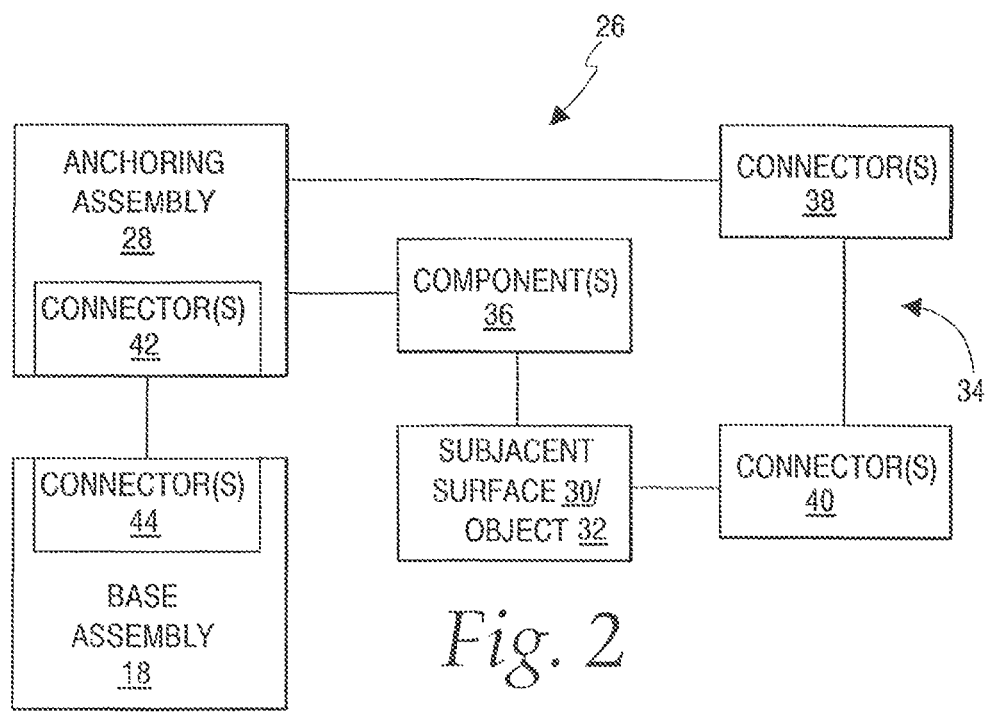
FIG. 2 is a schematic representation of the inventive security system.

The inventive security system is shown schematically at 26 in FIG. 2 and consists of an anchoring assembly 28 that is configured to be operatively secured relative to a subjacent surface 30 and/or another object 32 in the vicinity of the subjacent surface 30 at a display location at which the display 10 is to be supported to prevent removal of the display 10 from the display location.

The security system 26 includes a fastening system 34 configured to maintain the anchoring assembly 28 operatively secured with respect to the subjacent surface 30 and/or object 32. In one form, the fastening system 34 consists of at least one component 36 that fixes the anchoring assembly 28 to the subjacent surface or object 32. The component(s) 36 may be a simple fastener, such as a threaded fastener.

Alternatively, the fastening system 34 may utilize an adhesive. An adhesive layer might be used to effect a permanent connection. Alternatively, a double-sided adhesive system might be used that will effectively preclude unauthorized removal but allow separation of the anchoring assembly 28, as for relocation thereof.

In addition to the use of the component(s) 36, or as an alternative thereto, connectors 38, 40, respectively on the anchoring assembly and subjacent surface 30 or object 32, may interact to either fix the anchoring assembly 28 to the subjacent surface 30/object 32 or allow a controlled limited amount of movement relative thereto.

As a further alternative, the component(s) 36 might be part of a tether-type arrangement to confine movement of the anchoring assembly 28 relative to the subjacent surface 30/object 32, to which the anchoring assembly 28 is operatively secured, to within a predetermined range.

The anchoring assembly 28 and base assembly 18 interact through cooperating connectors 42, 44, respectively on the anchoring assembly 28 and base assembly 18. Through these connectors 42, 44, the security system 26 and display 10 can be releasably placed in an engaged relationship wherein the base assembly 18 cannot be separated from the anchoring assembly 28. Accordingly, the display 10 is not separable from the anchoring assembly 28, which is either fixed to or controlled in movement relative to, the subjacent surface 30 and/or object 32.

The schematic showing of the components in FIGS. 1 and 2 is intended to encompass the specific embodiments described hereinbelow as well as variations thereof, which include variations of the individual components and their interaction. Virtually an unlimited number of variations would be obvious to one skilled in the art with the present teachings in hand. As noted, the specific forms described hereinbelow are exemplary in nature only.

Figures 3, 4:
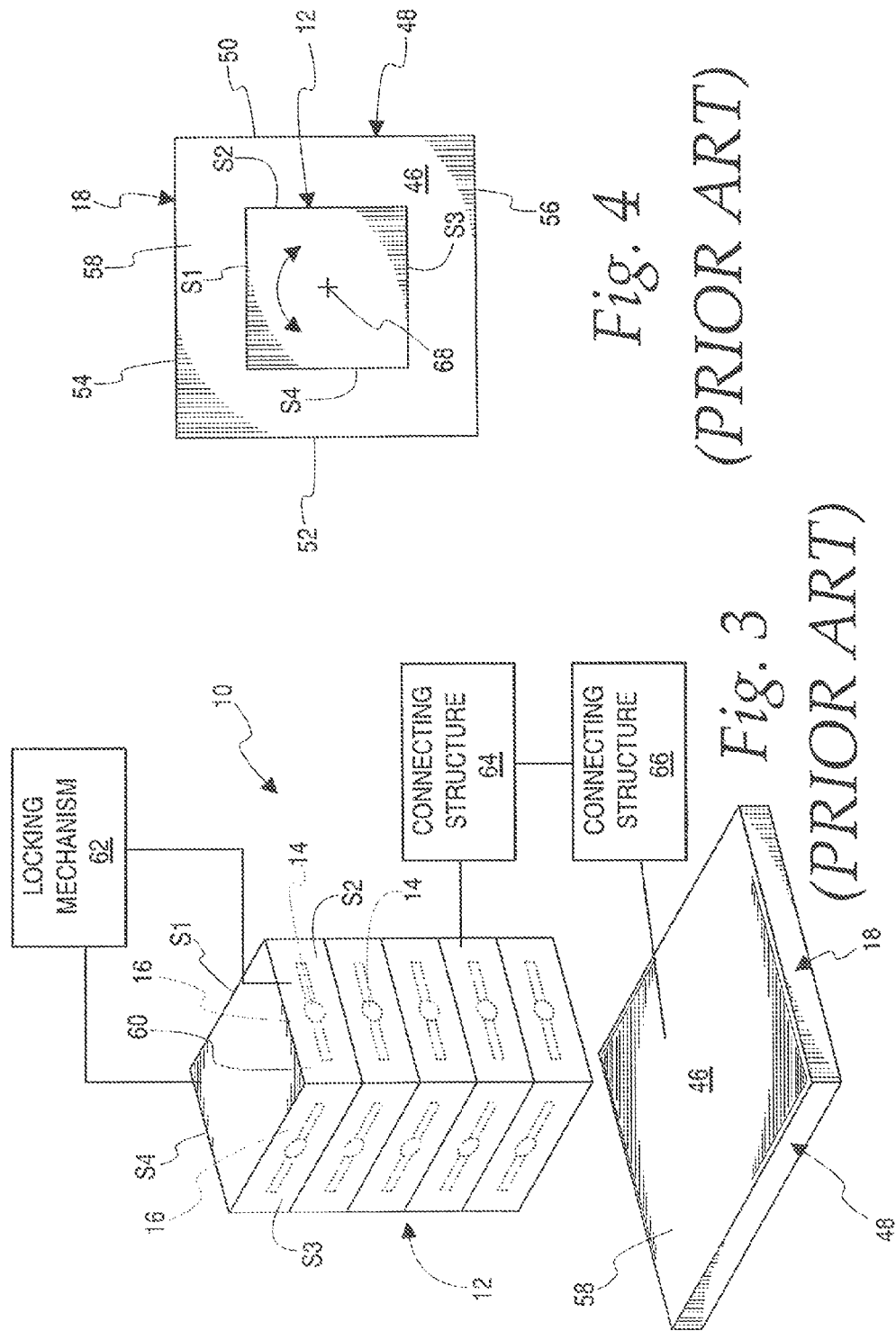
FIG. 3 is a partially schematic, exploded, perspective view of one specific known form of display, as shown schematically in FIG. 1.
FIG. 4 is a plan view of the assembled display in FIG. 3.

An exemplary conventional form of display 10, relative to which the inventive security system 26 will be described, is shown in FIGS. 3 and 4. The base assembly 18 consists of a squared panel 46 with a perimeter edge at 48 defined by spaced parallel edge portions 50, 52 and spaced, parallel edge portions 54, 56 that are orthogonal to the edge portions 50, 52.

The support assembly 12 is supported at an upper surface 58 of the base assembly 18. The support assembly 12 has a box shape with perimeter sides S1, S2, S3, S4 at which a plurality of the receptacles 16 are formed for maintaining articles 14 visible in a display position at each side S1, S2, S3, S4. Access may be gained to each receptacle 16 through a repositionable door/drawer 60 that may be maintained in a closed position through a conventional type locking mechanism as shown at 62. An open construction is also common for articles that are less expensive and commonly handled for inspection by potential purchasers.

In this embodiment, the support assembly 12 is maintained in its operative state through cooperating connecting structure 64, 66, respectively on the support assembly 12 and base assembly 18. While not a requirement, in this embodiment, the connecting structures 64, 66 interact so that the support assembly 12 can be turned around a vertical axis 68 relative to the base assembly 18, thereby to serially expose articles 14 at different sides as the potential purchaser turns, or causes to be turned, the support assembly 12.

The security system 26 is designed to connect to the base assembly 18 in a manner whereby the support assembly 12 and base assembly 18 can interact in the same manner as if they were independent of the security system 26. The security system 26 essentially assures that no unauthorized person can either move the base assembly 18 relative to the subjacent surface 30/object 32, or move the same outside of a controlled range dictated by the configuration of the security system 26.

Details of one preferred form of the security system 26, shown schematically in FIG. 2, will now be described with respect to FIGS. 5-9. For purposes of simplicity, the interaction between the display 10 and security system 26 will be limited to the interaction between the base assembly 18 on the display 10 and the security system 26, with it being understood that the display would be operated as described with respect to FIGS. 3 and 4.

The anchoring assembly 28 consists of a support wall 70 with an upwardly facing flat surface 72 upon which the base assembly 18 is supported with the security system 26 and display 10 in the engaged relationship, as shown in FIG. 5. A downwardly facing surface 74 on the base assembly 18 facially abuts to the upwardly facing surface 72.

In this embodiment, the primary connectors 42 on the anchoring assembly 28 are shown in multiple positions, and in this case are six in number—42a, 42b, 42c, 42d, 42e, 42f. As shown in FIG. 6, exemplary connector 42d consists of an angled tab 76d extending away from the support wall 70. The tab 76d has an "L" shape with a vertically extending leg 78d and a horizontally extending leg 80d.

The underside surface 82d of the leg 80d and the upwardly facing surface 72 of the support wall 70 define a pair of oppositely facing surfaces between which a part of the base assembly 18 is captively maintained with the security system 26 and display 10 in the engaged relationship.

A corresponding pair of oppositely facing surfaces is provided at each location where the tabs 42a-42f reside. With the six tab arrangement, the panel 46 is positively maintained against vertical separation from the security system 26. At each such tab location, the oppositely facing panel surfaces 58,84 in the vicinity of the tabs 42a-42f perform the function of the connectors 44 identified in FIG. 2.

The tabs 42a-42f and panel 46 define additional pairs of oppositely facing surfaces that cooperate to maintain the panel 46 against horizontal translational movement relative to the anchoring assembly 28 with the security system 26 and display 10 in the engaged relationship.

More specifically, as shown in FIG. 7, the exemplary tabs 42a, 42d define oppositely facing surfaces 86a, 86d on the legs 78d, 78a between the full width dimension W of the panel 46 is captively maintained. The edge portions 50, 52 define surfaces that make up the connectors 44.

The tabs 42a-42f are strategically located to effect positive reinforcement of the connection between the anchoring assembly 28 and the panel 46. As noted above, the precise number of the tabs 42a-42f is not critical to the invention. In the arrangement shown, the tabs 42c, 42e and 42b, 42f align widthwise with each other whereas the tabs 42a, 42d align in a front-to-rear direction as indicated by the double-headed arrow 88.

In a generic sense, at least one of the oppositely facing surfaces is repositionable relative to the support wall 70 to change the security system 26 and display 10 from the engaged relationship into an assembly relationship, as shown in FIG. 8. In this assembly relationship, the display 10 can be selectively joined with and separated from the security system 26.

To permit this change of state, a wall 90, upon which the tabs 42e, 42f are formed, is movable between the FIG. 5 and FIG. 8 positions, corresponding respectively to the engaged and assembly relationships for the security system 26 and display 10. To allow this repositioning, a hinge 92 connects between the wall 90 and the support wall 70 and defines a horizontal pivot axis 94. As the wall 90 is pivoted from the FIG. 5 position into the FIG. 8 position, the wall 90 and hinge situate beneath the plane of the surface 72 of the support wall 70. As shown in FIG. 8, the separated panel 46 is then allowed to translate in the direction of the arrow 96 until the FIG. 5 position is realized, whereupon the wall 90 can be pivoted back to the FIG. 5 position to complete assembly.

With the wall 90 in the position shown in FIG. 8, the surfaces 86e, 86f are in a first position wherein they do not confront the panel 46. By pivoting the wall 90 into the FIG. 5 position, the surfaces 86e, 86f assume a second position wherein they confront the surface defined by the edge portion 56. At the same time, the downwardly facing tab surfaces 82e, 82f change between corresponding first and second positions and in the latter confront the upwardly facing panel surface 58 to thereby captively maintain the thickness of the panel 46 between the surfaces 46, 74 in conjunction with the surface 72.

Laterally spaced locking tabs 98a, 98b define another oppositely facing pair of surfaces 100a, 100b that cooperate to capture the full front-to-rear dimension of the panel 46 in the FIG. 5 state. The tabs 98a, 98b additionally perform the function of facilitating locking of the wall 90 in the FIG. 5 position. In that position, offset ends 102a, 102b on the wall 90 overlie the tabs 98a, 98b. Like fasteners 104 are directed through the overlapped tabs and wall ends 98a, 102a; 98b, 102b. By using a security head at 106, removal of the fasteners 104 by unauthorized personnel can be controlled.

The anchoring assembly 28 further includes at least one, and as depicted two, like spacers 108 that reside between the support wall 70 and the subjacent surface 30 upon which the anchoring assembly 28 is operatively secured. The spacers 108 provide vertical clearance to allow the wall 90 to pivot unimpededly between the FIG. 5 and FIG. 8 positions.

The spacers 108 each has a U-shaped channel configuration with a longer upper leg 110 and a shorter lower leg 112. The channel shape can define the aforementioned shape of the connectors 38 that cooperate with the connectors 40, in turn connected to the subjacent surface 30 and/or object 32.

Alternatively, the spacers 108 may define the aforementioned components 36 that are directly secured to the subjacent surface 30 and/or object 32.

One skilled in the art could devise a multitude of different ways to fixedly attach the anchoring assembly 28 in relationship to the subjacent surface 30 and/or object 32. As one example, a double-sided adhesive layer might be employed for this purpose, situated as between the underside of the leg 12 and an underlying support surface/structure.

Alternatively, the connection relative to the subjacent surface 30 and/or object 32 may be effected through the use of a tether or a mechanism utilizing the cooperating connectors 38, 40 that allows limited controlled movement between the anchoring assembly 28 and the subjacent surface 30 and/or object 32.

In the depicted embodiment, the support wall 70 and tabs 42a-42f and 100a, 100b are formed as one piece. This piece can be struck from a sheet material, after which the tabs 42a-42f, 100a, 100b are bent into the depicted shapes. Of course, a multipart construction is also contemplated.

With the above-described structure, a method of securing a display can be carried out as shown in flow diagram form in FIG. 10. As shown at block 114, the desired form of components is obtained.

As shown at block 116, the anchoring assembly is operatively secured at a display location.

As shown at block 118, with the movable wall in one position relative to the support, the display assembly can be translated from an initially separated position relative to the anchoring assembly to thereby cause first and second parts of the base assembly to be respectively captively located between the first and second pairs of oppositely facing surfaces.

As shown at block 120, the movable wall, with a surface in one of the oppositely facing surface pairs, can be repositioned relative to the support wall to thereby place the security system and display into the engaged relationship.

The foregoing disclosure of specific embodiments is intended to be illustrative of the broad concepts comprehended by the invention.

The invention claimed is:

1. In combination:
a) a display comprising:
a support assembly configured to maintain at least one article in a display position; and
a base assembly configured to maintain the support assembly in an operative state on a subjacent surface wherein the support assembly can be moved relative to the base assembly to reposition an article in the display position relative to the base assembly; and
b) a security system comprising:
an anchoring assembly configured to be operatively secured relative to at least one of: i) a subjacent surface; and ii) another object in the vicinity of a subjacent surface at a display location at which the display is to be supported to prevent removal of the display from the display location,
the security system and display configured to be releasably placed in an engaged relationship wherein the base assembly cannot be separated from the anchoring assembly.

2. The combination according to claim 1 wherein the anchoring assembly comprises: a) a first pair of oppositely facing surfaces between which a first part of the base assembly is captively maintained with the security system and display in the engaged relationship; and b) a second pair of oppositely facing surfaces between which a second part of the base assembly is captively maintained with the security system and display in the engaged relationship.

3. The combination according to claim 2 wherein the anchoring assembly comprises a support wall with an upwardly facing surface upon which the base assembly is supported with the security system and display in the engaged relationship and at least one of the oppositely facing surfaces is repositionable relative to the support wall to change the security system and display from the engaged relationship into an assembly relationship wherein the display can be separated from the security system.

4. The combination according to claim 3 wherein the upwardly facing support wall surface defines one of the oppositely facing surfaces.

5. The combination according to claim 3 wherein one of the oppositely facing surfaces is repositionable relative to the support wall by pivoting about an axis between first and second position, the one of the oppositely facing surfaces in: a) the first position with the security system and display in the assembly relationship; and b) the second position with the security system and display in the engaged relationship.

6. The combination according to claim 3 wherein one of the oppositely facing surfaces in the first pair of oppositely facing surfaces is substantially orthogonal to one of the oppositely facing surfaces in the second pair of oppositely facing surfaces.

7. The combination according to claim 4 wherein the anchoring assembly comprises a first angled tab that projects from the support wall and defines with the upwardly facing support wall surface one of the pairs of oppositely facing surfaces.

8. The combination according to claim 7 wherein the first angled tab defines one of the oppositely facing surfaces in another of the pairs of oppositely facing surfaces.

9. The combination according to claim 7 wherein the first angled tab has an "L" shape and there are a plurality of angled tabs the same as the first angled tab that each defines with the upwardly facing wall surface one of the pairs of oppositely facing surfaces.

10. The combination according to claim 1 wherein the security system and display are configured so that the base assembly initially separated from the anchoring assembly must be translated relative to the anchoring assembly to place the security system and display in the engaged relationship.

11. The combination according to claim 7 wherein the first angled tab and support wall are defined by a single piece.

12. The combination according to claim 1 wherein the support assembly is configured to be moved relative to the base assembly around an axis.

13. The combination according to claim 1 wherein the security system comprises a fastening system configured to maintain the anchoring assembly operatively secured.

14. The combination according to claim 13 wherein the fastening system comprises at least one of: a) at least one component configured to fix the anchoring assembly to a subjacent surface; and b) at least one component configured to confine movement of the anchoring assembly relative to a subjacent surface to which the anchoring assembly is operatively secured to within a predetermined range.

15. The combination according to claim 5 wherein the combination further comprises a fastener for releasably fixing a wall on which the one of the oppositely facing surfaces is defined to thereby maintain the one of the oppositely facing surfaces in the second position.

16. The combination according to claim 3 wherein the anchoring assembly further comprises at least one spacer that acts between the support wall and a subjacent surface upon which the anchoring assembly is supported with the anchoring assembly operatively secured.

17. The combination according to claim 15 wherein there is a tab that projects from the wall on which the one of the oppositely facing surfaces is defined that defines another one of the oppositely facing surfaces.

18. The combination according to claim 3 wherein the support wall has a peripheral edge defined by: a) a first pair of spaced substantially straight and parallel edge portions; and b) a second pair of spaced substantially straight and parallel edge portions that are angled with respect to the first pair of edge portions.

19. The combination according to claim 1 wherein the support assembly has a vertical central axis and a plurality of sides spaced around the vertical central axis in each of which a receptacle is defined for an article to be placed in a display position.

20. A method of securing a display in the combination as recited in claim 3, the method comprising the steps of:
operatively securing the anchoring assembly at a display location;
with the one oppositely facing surface in one position relative to the support wall translating the display assembly from an initially separated position relative to the anchoring assembly to thereby cause the first and second parts of the base assembly to be respectively captively located between the first and second pairs of oppositely facing surfaces; and
repositioning the one oppositely facing surface relative to the support wall to thereby place the security system and display into the engaged relationship.

* * * * *